United States Patent [19]

Cink et al.

[11] Patent Number: 5,787,438
[45] Date of Patent: Jul. 28, 1998

[54] METHOD AND APPARATUS FOR INCORPORATING POLICIES IN SEARCHES FOR FACTORY OBJECTS

[75] Inventors: Kimberly Ann Cink, Rochester, Minn.; Russell Ley Newcombe, Round Rock, Tex.

[73] Assignee: International Business Machines Corporation, Armonk, N.Y.

[21] Appl. No.: 741,728

[22] Filed: Oct. 31, 1996

[51] Int. Cl.⁶ .................................................. G06F 17/30
[52] U.S. Cl. .......................... 707/103; 707/100; 707/102; 395/50; 395/75; 395/77
[58] Field of Search ................................ 787/100; 707/103, 707/102; 395/50, 77, 75

[56] References Cited

U.S. PATENT DOCUMENTS

| | | | |
|---|---|---|---|
| 5,107,497 | 4/1992 | Lirov | 395/183.02 |
| 5,398,336 | 3/1995 | Tantry | 707/103 |
| 5,446,885 | 8/1995 | Moore | 707/103 |
| 5,630,127 | 5/1997 | Moore | 707/104 |
| 5,659,740 | 8/1997 | Ezaki | 707/103 |
| 5,710,887 | 1/1998 | Chelliah | 395/50 |

OTHER PUBLICATIONS

Corbaservices: Common Object Services Specification, Revised Edition Mar. 31,1995, Object Management Group, Inc. (OMG).

*Primary Examiner*—Thomas G. Black
*Assistant Examiner*—Diane D. Mizvali
*Attorney, Agent, or Firm*—David A. Mims, Jr.

[57] ABSTRACT

The specification of specific user policies in an object oriented environment is allowed prior to a search for factory objects. A ConstraintBuilder interface object is contained within an Object Management Group's (OMG) Factory-Finder object. The ConstraintBuilder object is a subclass of an abstract ConstraintBuilder interface, and contains a method which accepts specific policy information from a user, processes the information, and returns the policy controls in a format understandable by an underlying search mechanism. The policies embodied by ConstraintBuilder objects may then be considered during searches for factory objects in order to eliminate factory objects that do not adhere to the specified policies, thus allowing for control of factory objects returned by a search mechanism.

12 Claims, 8 Drawing Sheets

METHOD AND APPARATUS FOR INCORPORATING POLICIES IN SEARCHES FOR FACTORY OBJECTS

FIELD OF THE INVENTION

The present invention relates to data processing systems, and more particularly, to incorporating user specified policies when searching for object factories in an object oriented programming environment.

CROSS REFERENCE TO RELATED APPLICATIONS

This application is related in subject matter to the following applications filed concurrently herewith and assigned to a common assignee:

Application Ser. No. 08/741,729 pending filed by Kimberly Cink and Russell Newcombe entitled, "Mechanism to Define Scope of a CORBAservices FactoryFinder".

Application Ser. No. 08/741,730 pending filed by Kimberly Cink and Russell Newcombe entitled, "Method and Apparatus For An Improved Specialization of A CORBAservice GenericFactory".

Application Ser. No. 08/616,116 filed by Kimberly Cink and Russell Newcombe entitled, "Method and System For Data Filtering Within An Object-Oriented Data Processing System".

The foregoing co-pending applications are incorporated herein by reference.

BACKGROUND OF THE INVENTION

The development of application and system software for data processing systems has traditionally been a time-consuming and somewhat repetitive task, with software developers often having to write or rewrite code to perform well-known user interface and system functions in addition to writing the code utilized to implement the desired new functionality. Recently, object-oriented programming (OOP) has emerged as a dominant new programming paradigm that enables the rapid development and implementation of functionality while permitting the customization and reuse of objects.

The power of OOP as a software development philosophy is realized chiefly through object frameworks, which provide a collection of base object classes that can be selectively utilized by a system developer to create a software system, much like a hardware developer might construct a desktop computer from standard hardware components. Object frameworks are particularly advantageous when utilized within a distributed computing environment in which multiple, possibly heterogeneous, computer systems are interconnected to allow system hardware and software resources to be shared between computer systems. In order to permit programs written in multiple diverse languages to utilize object classes defined within a single object framework, it is necessary to develop a minimum level of object standardization, thereby enabling, at least to some degree, the interoperability of object-oriented software. One organization that is working to establish industry guidelines and object management specifications to provide a common object framework for application development is the Object Management Group (OMG). The specifications promulgated by OMG enable the reusability, portability, and interoperability of object-based software in heterogeneous distributed computing environments (HDCE). An example of a commercially available object framework that conforms to OMG specifications is the Distributed System Object Model (DSOM), which is described, for example, in the "SOM Objects Toolkit version 3.0 Programmer's Guide, Volume 1: SOM and DSOM", available from International Business Machines Corporation.

The Object Management Group (OMG) defines an industry standard for Life Cycle Services in "CORBAservices: Common Object Services Specification", OMG Document No. 95-3-31. Within the OMG Life Cycle Services standard, a number of object-oriented programming interfaces are defined in support of the creation and destruction of objects within a heterogeneous distributed computing environment (HDCE). Among the interfaces introduced within the OMG Life Cycle Services standard is the FactoryFinder interface, which provides a standard service that can be utilized by applications to locate a Factory object (e.g., an object that is used to create instances of other objects) within the heterogeneous distributed computing environment (HDCE).

The OMG FactoryFinder interface introduces an operation called find_factories, which returns an Interface Definition Language (IDL) sequence of Factory objects that satisfy input criteria specified within a factory_key input parameter. In heterogenous distributed data processing systems that contains hundreds or thousands of objects, of which many may satisfy a particular factory_key, the number of Factory objects returned in the sequence can be large. Consequently, the user may desire to reduce the number of objects considered by and/or returned by the FactoryFinder on the basis of an additional static policy, such as a specific server on which the Factory objects reside.

Although reducing the number of objects considered by and/or returned by an OMG FactoryFinder object is highly desirable, the OMG specifications do not define a standard interface which enables a user to reduce the number of Factory objects considered during the search. Although additional policies may be encapsulated within a Factory-Finder object, each of these additional policies would require a unique implementation of FactoryFinder. In addition, a unique FactoryFinder implementation would be required to combine multiple policies within a single FactoryFinder. Consequently, it would be desirable to provide an interface capable of reducing factory objects considered during the search based upon a selected policy, and more particularly, an interface compatible with the OMG FactoryFinder interface that constrains the search of the Factory-Finder based upon a user-selected static policy. It is also desirable to be able to associate one or more constraint objects with a FactoryFinder object so that any combination of policies can be simultaneously supported by a single FactoryFinder implementation.

SUMMARY OF THE INVENTION

This invention relates to a method and apparatus for specifying, prior to a search for factory objects, specific policies which can limit/constrain the factory search. An abstract ConstraintBuilder interface is provided which can be subclassed to provide a ConstraintBuilder object, containing a method (e.g., perhaps build_constraint) which accepts specific business policy information from a user, processes the information, and returns the policy controls in a format understandable by an underlying search mechanism. One or more subclasses of the abstract Constraint-Builder can be defined to provide objects that implement the method which incorporates the desired policies. Subclass implementors override the build_constraint method to perform the logic necessary to provide the controls for eliminating factories from consideration based on the specified policies. These ConstraintBuilder objects may be associated with FactoryFinder objects to constrain the search done by the FactoryFinder.

DETAILED DESCRIPTION OF THE EMBODIMENTS

Figure 1:
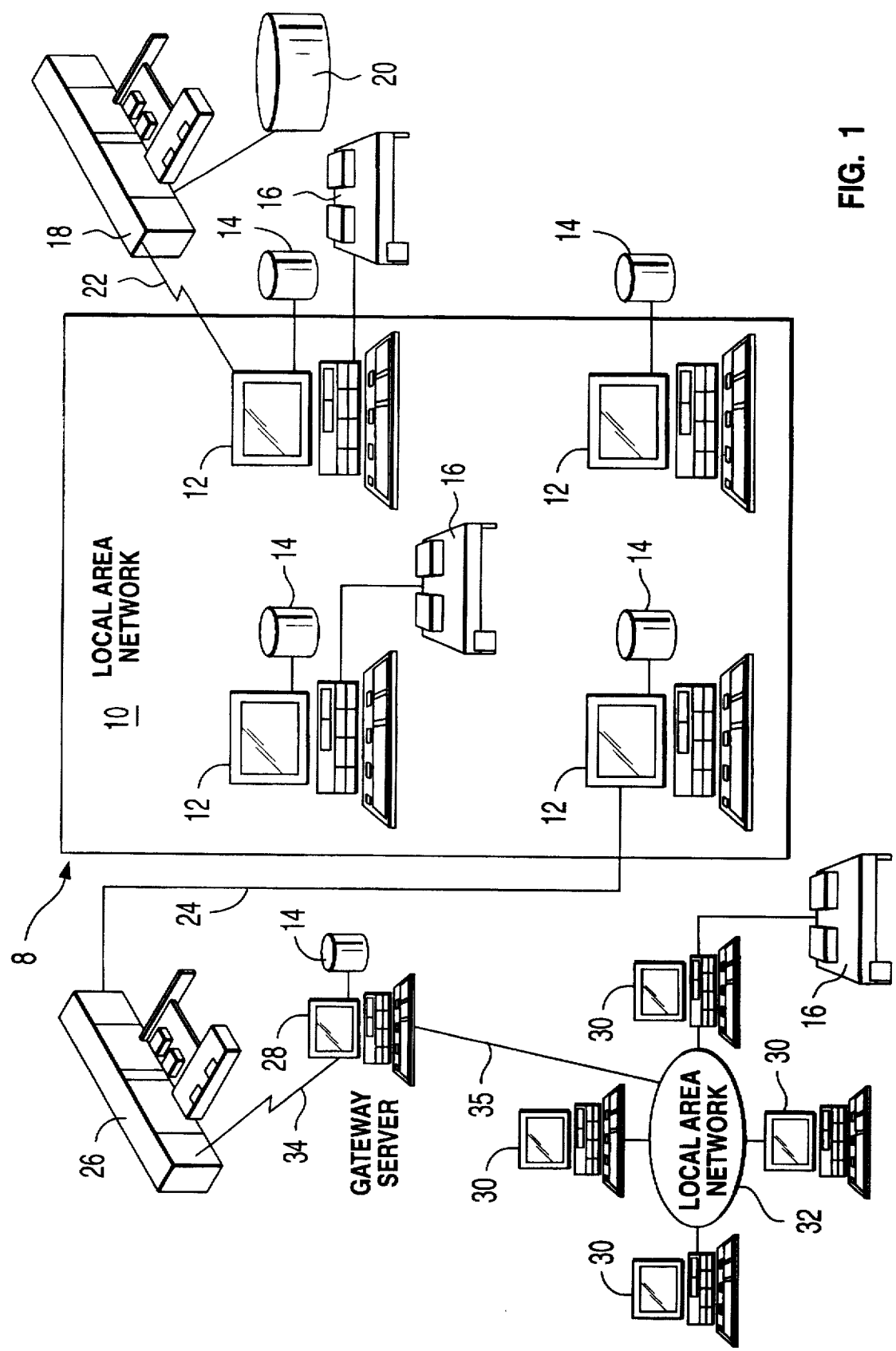
FIG. 1 is an illustrative embodiment of a heterogeneous distributed data processing system in accordance with the present invention.

This invention provides a method and apparatus for a ConstraintBuilder interface for specifying specific user defined business policies prior to searching for factory objects in an object-oriented environment. For the purpose of the invention, a factory object is an object that creates other objects. A business policy is a rule, regulation and/or procedure instituted and/or followed by an enterprise. These business policies can have affects on object-oriented data processing systems. For example, an enterprise may have a rule that employee data should only be accessed by members of the human resources department. This could result in the requirement that employee objects only be created on machines that provide sufficient security mechanisms to enforce the desired level of access control. A second example might require a new employee record be created by a supervisor in human resources. This could result in a requirement that non-supervisors be unable to get access to a factory used for creating employee objects. A representative hardware environment where this invention may be practiced is depicted in FIG. 1, which illustrates a pictorial representation of a distributed data processing system 8. As illustrated, data processing system 8 contains a plurality of networks, including local area networks (LAN) 10 and 32, each of which preferably includes a plurality of individual computers 12 and 30, respectively. One skilled in the art will appreciate that a plurality of workstations coupled to a host processor may be utilized for each such network. As is common in such data processing systems, each computer 12 and 30, may be coupled to a storage device 14, and a printer 16.

Data processing system 8 further includes one or more mainframe computers, such as mainframe computer 18, which may be preferably coupled to LAN 10 by means of a communication link 22. Mainframe computer 18 is preferably coupled to a storage device 20, which serves as remote storage for LAN 10. LAN 10 is also coupled via communications link 24 through communications controller 26 and communications link 34 to gateway server 28. Gateway server 28 is preferably a workstation which serves to link LAN 32 to LAN 10 via communications link 35. As understood by one skilled in the art, data processing system 8 additionally includes unillustrated gateways, routers, bridges, and various other network hardware utilized to interconnect the segments of data processing system 8.

Figure 2:
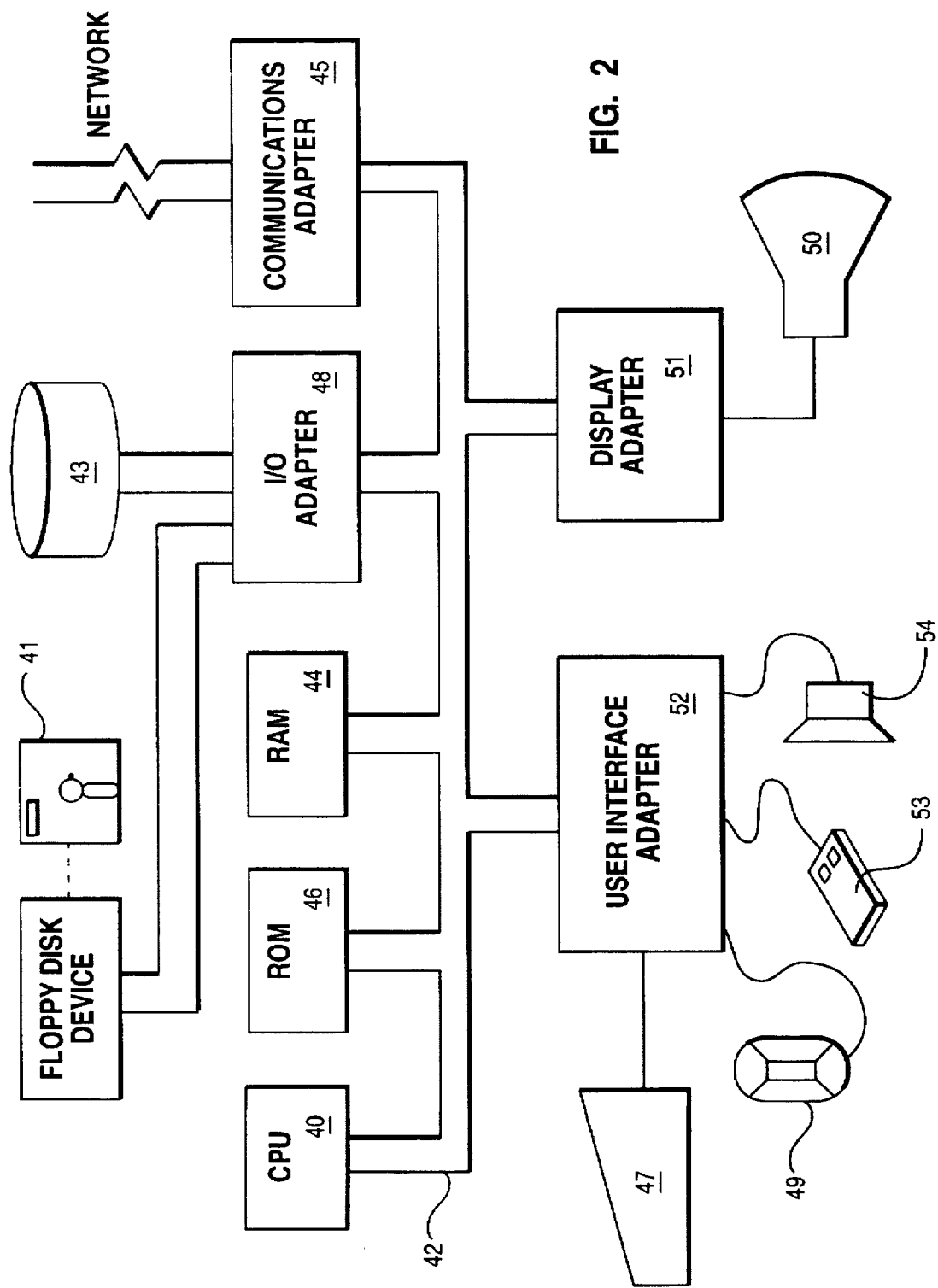
FIG. 2 is a block diagram of a computer/workstation within the distributed data processing system in FIG. 1.

Referring now to FIG. 2, there is shown a pictorial representation of a workstation, having a central processing unit 40, such as a conventional microprocessor, and a number of other units interconnected via a system bus 42. The workstation shown in FIG. 2, includes a Random Access Memory (RAM) 44, Read Only Memory (ROM) 46, an I/O adapter 48 for connecting peripheral devices such as disk unit 43 to the bus, a user interface adapter 52 for connecting a keyboard 47, a mouse 53, a speaker 54, a microphone 49, and/or other user interface devices such as a touch screen device (not shown) to the bus, a communication adapter 45, for connecting the workstation to a data processing network and a display adapter 51, for connecting the bus to a display device 50. The workstation, in the preferred embodiment, has resident thereon the OS/2 operating system and the computer software making up this invention which is included as a toolkit. One skilled in the art will appreciate that the procedures of this invention may be in the form of a computer program product on a computer readable medium, which may be temporarily or permanently loaded on the workstation in disk storage 43, floppy diskette 41, or RAM 44.

Figure 3:
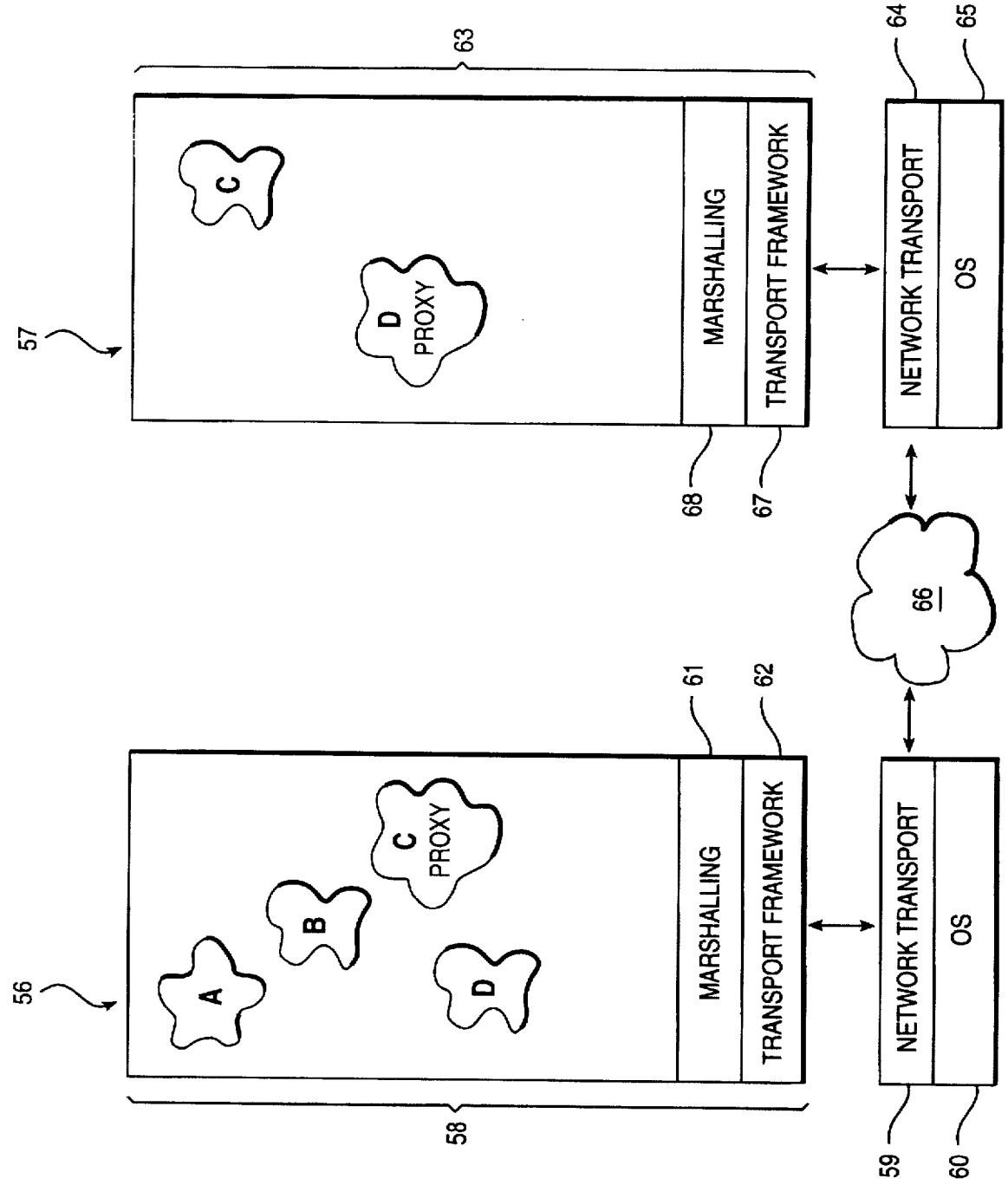
FIG. 3 is a pictorial representation of the generalized software configuration of two nodes within a heterogeneous distributed object-oriented computing environment.

With reference now to FIG. 3, there is illustrated a pictorial representation of the generalized software configuration of two nodes 56 and 57 within a heterogeneous distributed computing environment (HDCE), such as data processing system 8. As illustrated, nodes 56 and 57, which can comprise two of computers 12 within data processing system 8, execute software under the control of possibly diverse operating systems 60 and 65, respectively. Although diverse operating systems may be utilized by nodes 56 and 57, intercommunication between nodes 56 and 57 via network 66 is facilitated by network transport layers 59 and 64, which can comprise Transport Control Protocol/Interface Program (TCP/IP), for example. The software configurations of nodes 56 and 57 further comprise a distributed object environment 58 and 63 including objects A, B, C, and D. To illustrate the interaction of objects A–D within distributed object environment 58 and 63, assume that object A invokes a method of objects B and C, passing object D as a parameter, and that objects B and C belong to the same class. If object A calls object B, a local object, all of the interaction between objects A, B, and D occurs within the same local process and is controlled strictly by the dispatching and reference mechanisms of the local process. On the other hand, if object A calls object C, a remote object, the call is directed to object C proxy, which interacts with marshalling code 61 and transport framework 62 to package the call parameters into a message having a format suitable for transmission over network 66. In response to receipt of the message at node 57, network transport 64 passes the message to transport framework 67 and marshalling code 68, which demarshals the parameters to reconstruct the call of object C. Thereafter, an object D proxy is created and object C is called in the same manner as if object C was local to object A. Any requests from object C to object D are similarly handled through object D proxy. As can be seen from this description of a distributed object environment, an object can transparently interact with other objects within the distributed object environment without regard to whether the other objects reside at a local or remote node or whether the objects are within the same process.

Figure 4:
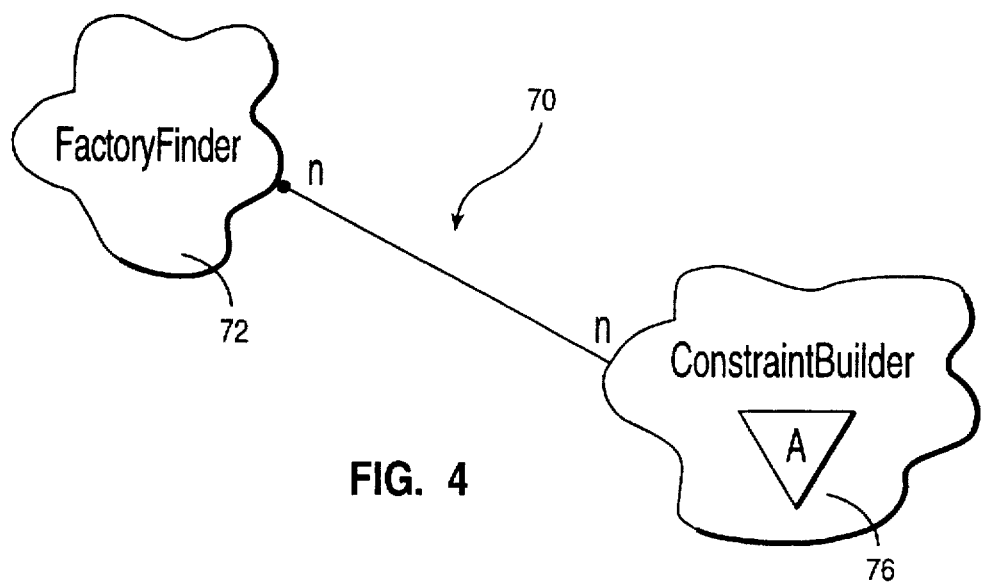
FIG. 4 depicts a class diagram illustrating the class relationship between an OMG FactoryFinder object and a ConstraintBuilder object having static policy control capabilities of the present invention.

Turning now to FIG. 4, there is shown an association 70 between the FactoryFinder object 72 and a ConstraintBuilder interface object 76. The FactoryFinder object 72, contains "zero" to "N" number of ConstraintBuilder interface objects 76. The ConstraintBuilder object 76, is contained by "zero" to "N" number of FactoryFinder objects 72. The ConstraintBuilder interface 76 object, is an abstract object which is subclassed and implemented to enforce a specific policy or policies.

Figure 5:
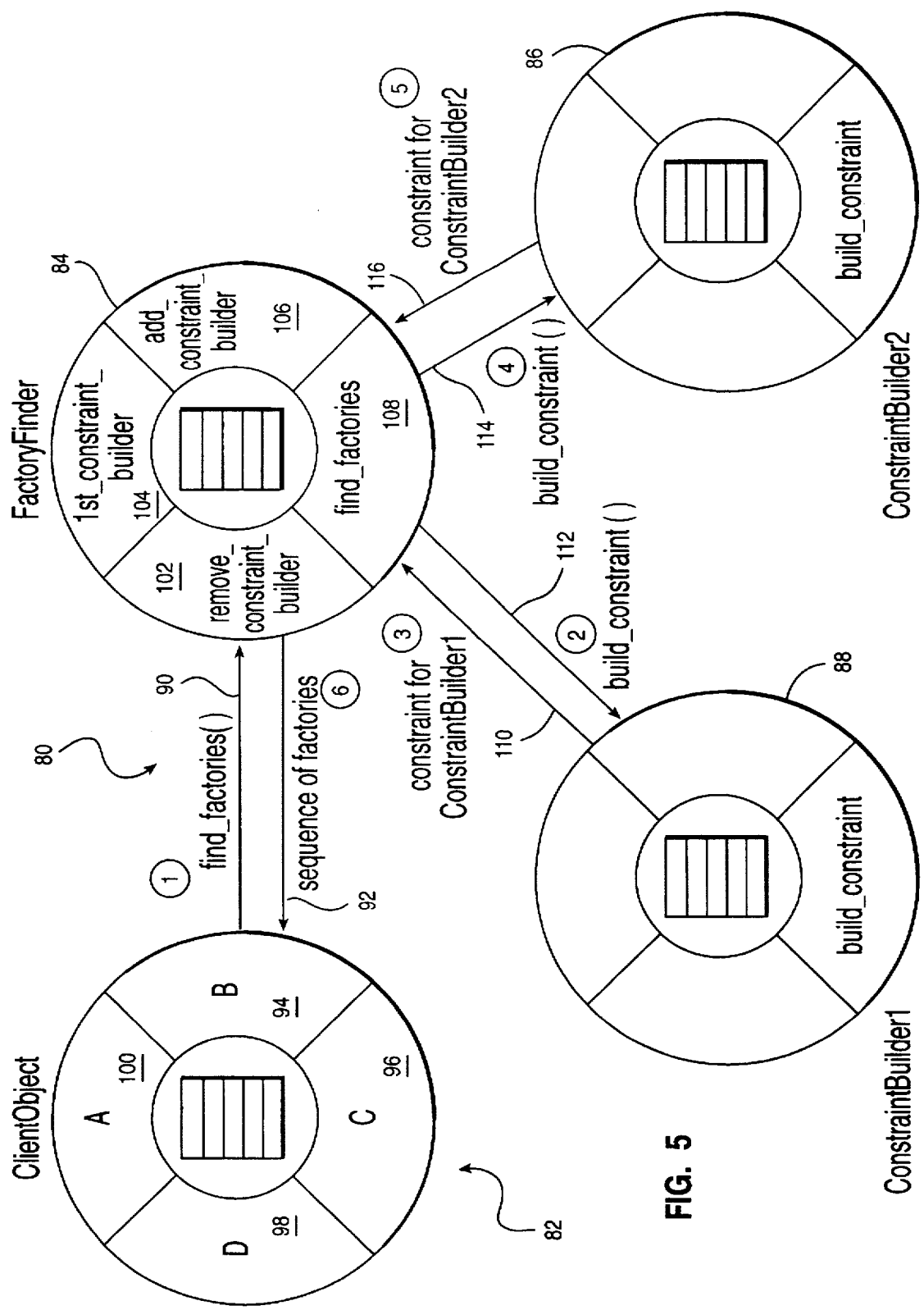
FIG. 5 illustrates a pictorial representation for accessing a list of factories by a client object from a FactoryFinder object subject to the policies embodied within ConstraintBuilder objects associated with the FactoryFinder.

With reference to FIG. 5, there is shown a procedure 80 for a client object to access a list of factories from a FactoryFinder object subject to the policies embodied within the ConstraintBuilder object(s) associated with the FactoryFinder object. Client code within ClientObject 82, invokes the find_factories method 90, on a FactoryFinder object 84. The FactoryFinder object 84, builds a list of requirements (i.e., a constraint) indicating the characteristics of the desired factories. The FactoryFinder object 84, invokes the build_constraint method 112, 114 on the ConstraintBuilder objects 86, 88. The constraint 110, 116 returned by each ConstraintBuilder object 86, 88 is incorporated into one large constraint that ultimately will be used for the factory search. The FactoryFinder object 84, performs the factory search and returns the factories 92, found during the search to the calling ClientObject 82. Note that the ConstraintBuilder associations with FactoryFinder objects are achieved using ADD, REMOVE and LIST logic which is illustrated in the FactoryFinder object 84, as add_constraint_builder 106, remove_constraint_builder 102, and list_constraint_builder 104, methods.

Figure 6:
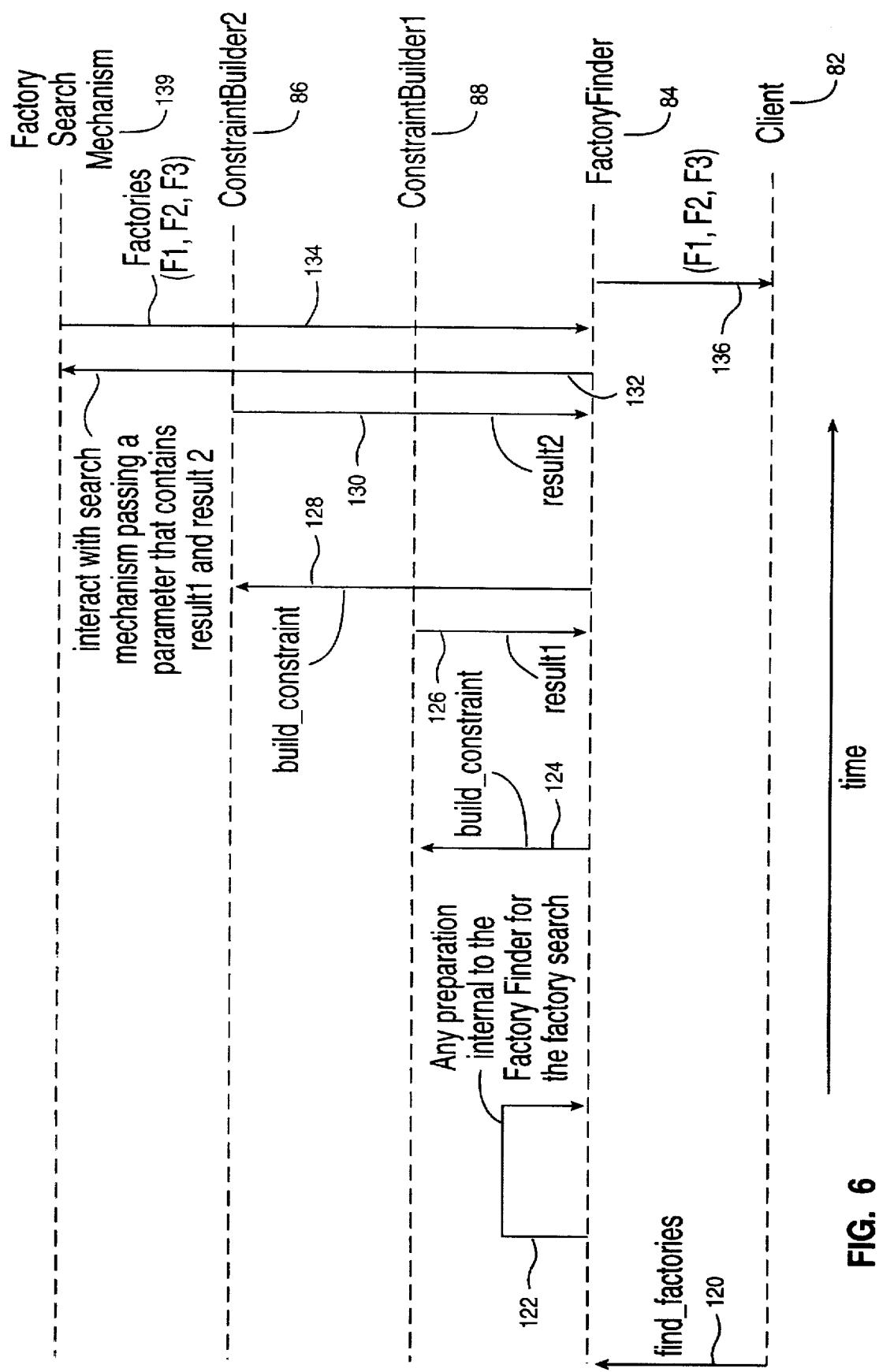
FIG. 6 illustrates a sequence diagram for searching for object factories using the ConstraintBuilder Interface object of the invention.

Turning now to FIG. 6, there is shown a sequence diagram showing the steps required to search factories using the ConstraintBuilder object of the invention. A client application 82, initiates a find_factories request 120, on a FactoryFinder object 84, with two ConstraintBuilder objects 88, 86 registered with it. Registration means "contained by" (i.e.,ConstraintBuilder objects 88, 86 were associated (registered) with FactoryFinder 84 using the add_constraint_builder method on the FactoryFinder 84. Any ConstraintBuilder objects registered with a FactoryFinder will automatically have their policies included in any factory searches done by the FactoryFinder). The FactoryFinder 84, performs internal preparation 122, for the factory search depending on its implementation. The FactoryFinder 84, then invokes the build_constraint method 124, for the first ConstraintBuilder 88, and incorporates the result 126, into the existing internal setup (prepared earlier) for the factory search. The same process is performed at 128 on ConstraintBuilder2 (86), and the result 130, is combined with the setup and result 126, from ConstraintBuilder1 (88). The FactoryFinder 84, interacts at 132 with a factory search mechanism 139, passing in any internal FactoryFinder requirements as well as the policies enforced by the result of the build_constraint calls on the ConstraintBuilder objects. The factory search mechanism 139, returns any factories at 134 that have the desired characteristics as specified by the FactoryFinder 84, and ConstraintBuilder objects 86, 88. The FactoryFinder 84, returns these factories at 136 to the client 82.

In FIG. 6, three factories (F1, F2, F3) were located that met the desired policies.

Figure 7:
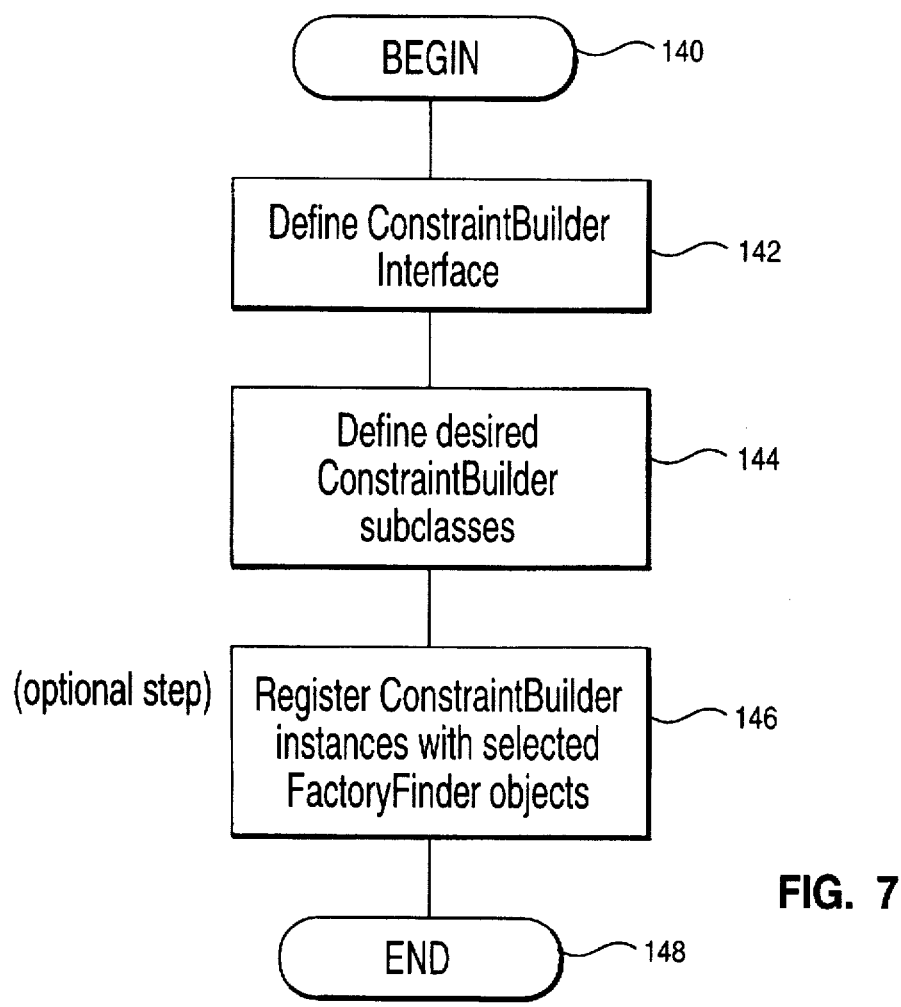
FIG. 7 is a flow diagram for providing a ConstraintBuilder policy mechanism of the invention.

With reference now to FIG. 7, there is shown a flow diagram illustrating the steps necessary in order to provide a ConstraintBuilder policy mechanism. The procedure begins at block 140, and moves immediately to block 142, where the ConstraintBuilder Interface or other similar interface is defined. This ConstraintBuilder interface preferably should be abstract since it does not carry policy information. The subclasses defined from it supply the policy information. The abstract ConstraintBuilder Interface introduces an abstract method, such as build_constraint, that will incorporate a policy when overridden. At block 144, the user desired ConstraintBuilder subclasses are defined. Each ConstraintBuilder subclass incorporates policy or policies. The build_constraint method is overridden and implemented such that it will accept parameter values, and from those values return a constraint with policy built in. In the preferred embodiment, instances of the ConstraintBuilder subclasses are registered as shown in block 146, with various FactoryFinder objects. However, this step may be eliminated if the ConstraintBuilder subclass is used independently of the FactoryFinder object. One skilled in the art will appreciate that it may be meaningful to directly invoke the build_constraint method in order to build a separate constraint or enforce the desired policy in a manner outside of a factory search. If instances of ConstraintBuilder subclasses are registered with various FactoryFinder objects, the policies enforced by these ConstraintBuilder objects will be incorporated into any factory searches conducted by the FactoryFinder objects they are registered with.

Figure 8:
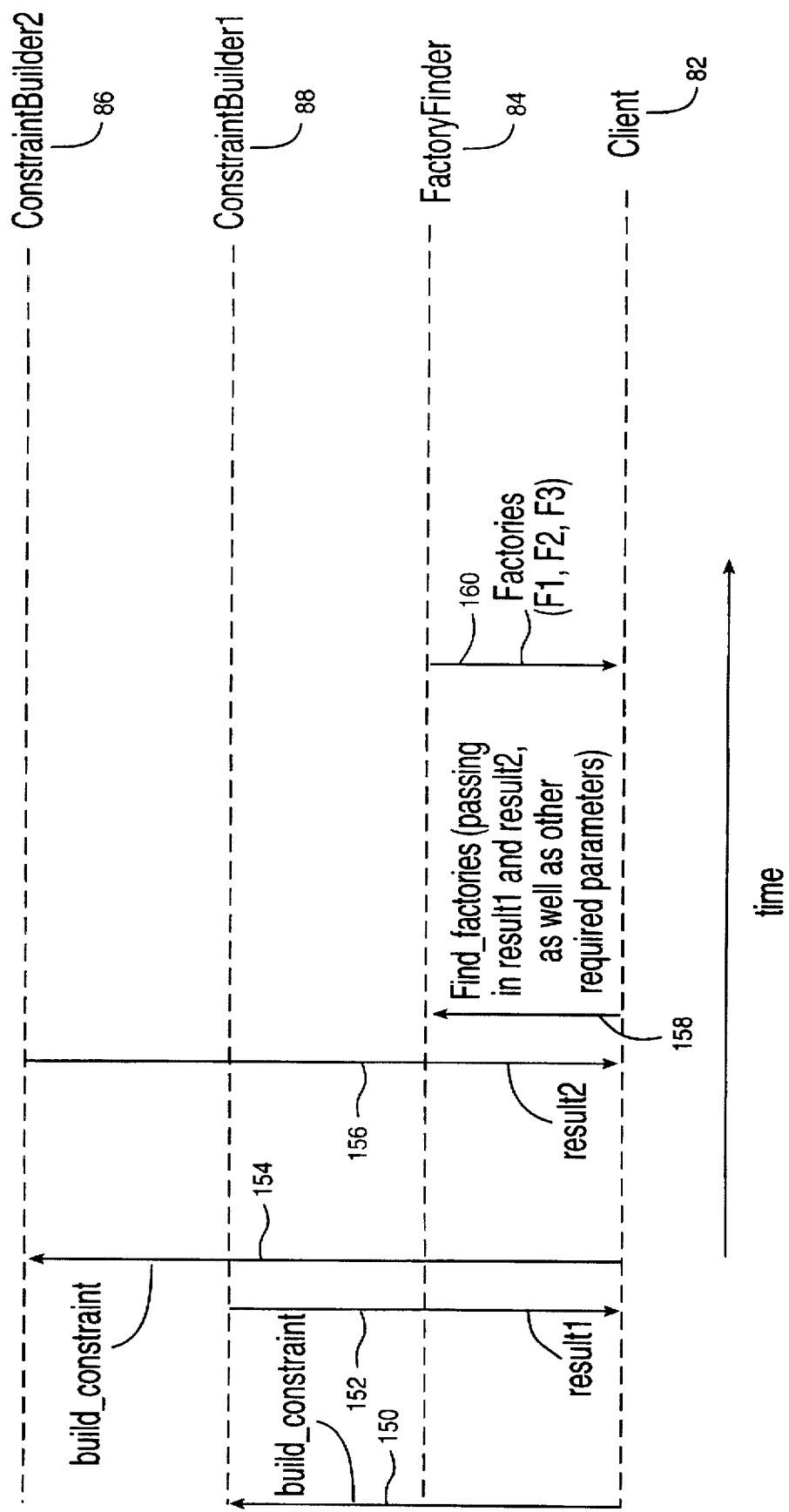
FIG. 8 is a sequence diagram illustrating a client object's interaction with a ConstraintBuilder Interface object of the invention.

Turning now to FIG. 8, there is shown a sequence diagram illustrating the client interaction with a ConstraintBuilder object to prepare results to be used with a FactoryFinder. Client object 82, invokes a build_constraint method 150 on ConstraintBuilder1 object 88. The ConstraintBuilder1 object 88, returns result1 152, to client object 82. Client object 82, then issues the build_constraint method 154, on ConstraintBuilder2 (86). ConstraintBuilder2 (86) returns result2 156 of its processing to client object 82. Client object 82, incorporates the results 152, 156 from the ConstraintBuilder objects 86, 88 and passes the results 158, directly to the FactoryFinder 84 via the KEY parameter. The FactoryFinder must know how to interpret the parameters specified in the KEY. The FactoryFinder 84, locates the factories with the desired characteristics and the factories 160, are returned to the client 82.

Figure 9:
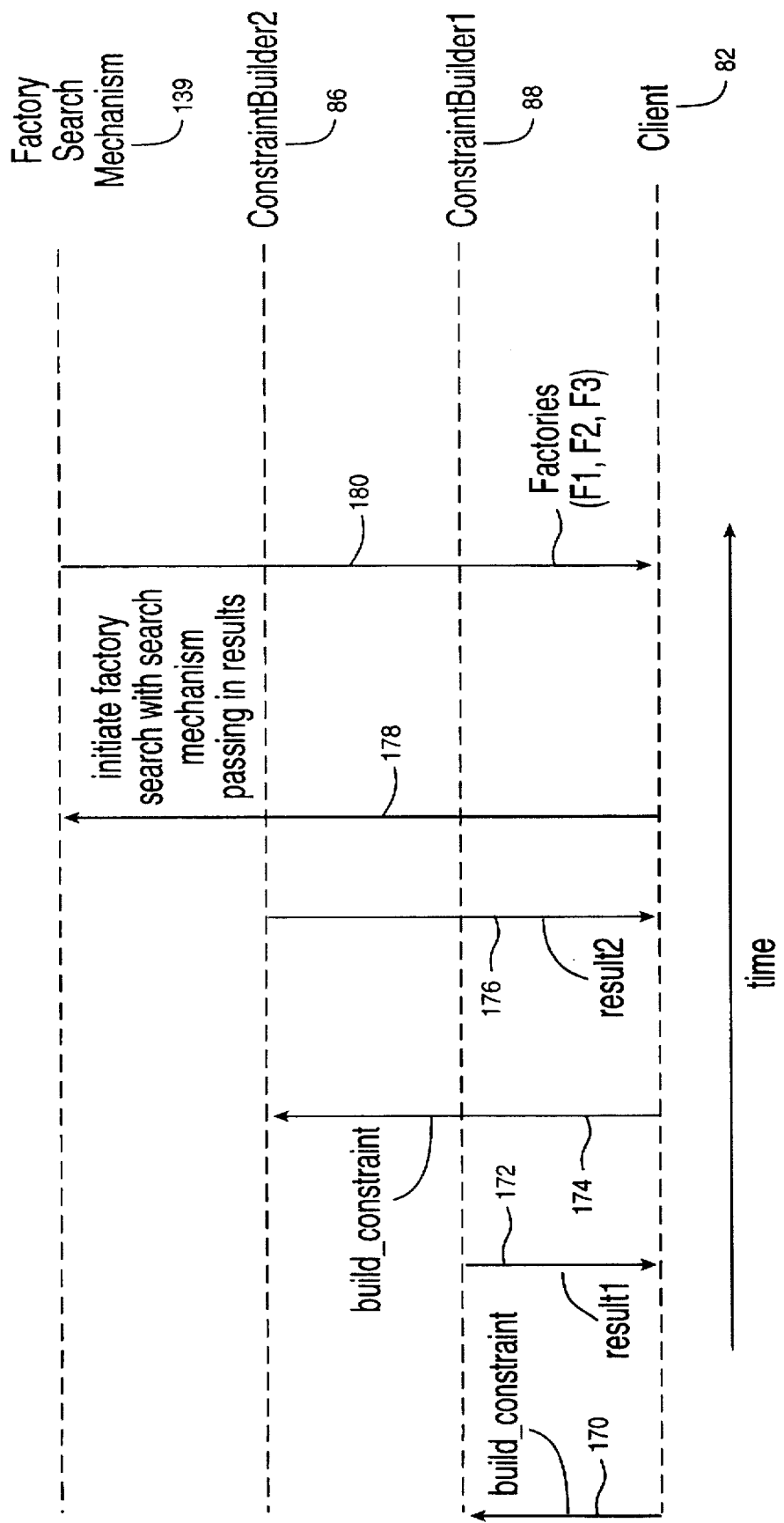
FIG. 9 is a sequence diagram illustrating a client object's interaction with a ConstraintBuilder Interface object and factory search mechanism in a stand-alone configuration.

With reference to FIG. 9, there is shown a sequence diagram illustrating how a client interacts with a ConstraintBuilder object to prepare results to be used with the underlying factory search mechanism. A client 82, invokes a build_constraint method 170, on ConstraintBuilder1 object 88. ConstraintBuilder1 object 88, returns its result1 (172), to client object 82. The client object 82, repeats the procedure by invoking the build_constraint method 174, on ConstraintBuilder2 Interface object 86, which returns its result2 (176), to the client object 82. One skilled in the art will appreciate that the results from the ConstraintBuilder's build_constraint methods may be used in many different ways by the client. For example, the client may use the results to invoke various methods, passing the results as parameters. The ConstraintBuilder subclasses may be implemented to serve a variety of purposes, even outside of searches for factories. Anywhere policies must be enforced, ConstraintBuilder concepts may be applied. Returning to FIG. 9, the client object 82, combines the result1 (172), and result2 (176), information and initiates a factory search with the search mechanism 139, by passing the combined results 178. The factory search mechanism 139, uses the information and returns the factories 180, found during the search.

While the invention has been described with respect to a preferred embodiment thereof, it will be understood by those skilled in the art that various changes in detail may be made therein without departing from the spirit, scope, and teaching of the invention. Accordingly, the herein disclosed invention is to be limited only as specified in the following claims.

What we claim is:

1. A method, implemented in a computer system, for creating an interface for building business policies into searches for object factories in an object oriented environment, comprising the steps of:

defining a constraint object in said object oriented environment having at least one method for accepting user specified information;

receiving and processing the user specified information based on internal logic within said at least one method; and formatting said user specified information created by said processing step for a search mechanism.

2. The method of claim 1, wherein the step of defining a constraint object further comprises the step of:

defining at least one subclass of said constraint object for said object oriented method.

3. The method of claim 1, wherein the step of defining a constraint object further comprises the step of:

providing said user specified business policy for eliminating object factories in said object oriented environment.

4. The method of claim 1, wherein the step of defining a constraint class further comprises the step of:

defining said constraint object as contained by a finder object in said object oriented environment.

5. An apparatus for creating an interface for building business policies into searches for object factories in an object oriented environment, comprising:

means for defining a constraint object in said object oriented environment having at least one method for accepting user specified information;

means for receiving and processing the user specified information based on internal logic within said at least one method; and means for formatting said user specified information created by said processing step for a search mechanism.

6. The apparatus of claim 5, wherein the means for defining a constraint object further comprises:

means for defining at least one subclass of said constraint object for said object oriented method.

7. The apparatus of claim 5, wherein the means for defining a constraint object further comprises:

means for providing a user specified business policy for eliminating object factories in said object oriented environment.

8. The apparatus of claim 5, wherein the means for defining a constraint class further comprises:

means for defining said constraint object as contained by a finder object in said object oriented environment.

9. A computer program product having a computer readable medium having computer program logic recorded thereon for building business policies into searches for object factories in an object oriented environment, comprising:

computer readable means for defining a constraint object in said object oriented environment having at least one method for accepting user specified information;

computer readable means for receiving and processing the user specified information based on internal logic within said at least one method; and computer readable means for formatting said user specified information created by said processing step for a search mechanism.

10. The computer program of claim 9, comprising:

computer readable means for defining at least one subclass of said constraint object for said object oriented method.

11. The computer program of claim 9, comprising:

computer readable means for providing said user specified business policy for eliminating object factories in said object oriented environment.

12. The computer program of claim 9, comprising:

computer readable means for defining said constraint object as contained by a finder object in said object oriented environment.

* * * * *